UNITED STATES PATENT OFFICE.

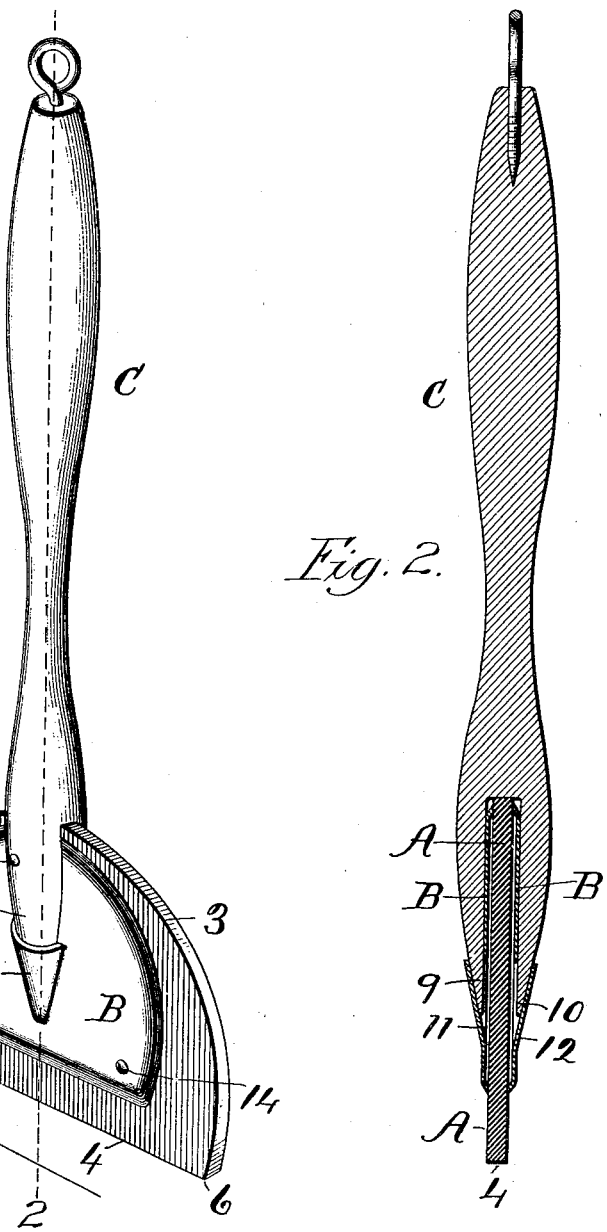

JOHN T. FOSKETT, OF CHICAGO, ILLINOIS.

DISH SCRAPER AND CLEANER.

No. 824,473.     Specification of Letters Patent.     Patented June 26, 1906.

Application filed January 8, 1906. Serial No. 295,157.

*To all whom it may concern:*

Be it known that I, JOHN T. FOSKETT, a citizen of the United States, residing at Chicago, in the county of Cook and State of Illinois, have invented new and useful Improvements in Dish Scrapers and Cleaners, of which the following is a specification.

This invention relates to an implement for cleaning table and kitchen ware, and has for its object to provide a simple, novel, and useful device of this character which will greatly facilitate the preliminary work of scraping and cleaning dishes and culinary utensils before the same are placed in the dish-water.

In the drawings, Figure 1 is a view in perspective of a device embodying the improved features; and Fig. 2 is a longitudinal section on line 2, Fig. 1, looking in the direction indicated by the arrow.

The implement comprises in its structure a scraper-pad A, the companion clamping or holding-plates B B, and a handle C. The scraper will ordinarily be of the D-shaped contour shown and is composed of any flexible or elastic material that is suitable for the purpose. A rubber substance is, however, used and considered preferable, as it retains its flexibility longer and is less liable to harden from use until worn out.

A scraper-pad of the form shown presents a rounded back edge 3, a straight scraping edge 4, and the corners 5 and 6. The scraper is held between the companion metal clamping-plates B B, leaving an all-around projecting edge, the area of which diminishes as the handle is approached. The clamping-plates impart to the scraper-body the required stiffness or rigidity in doing the work properly, increases the durability, and provides a holding-ground for the handle. The attaching end of the handle is bifurcated and presents the prong ends 9 and 10, which straddle the scraper and clamping-plates and is tightly inserted in the socket-recesses 11 and 12, formed on the respective outsides of the latter. A rivet-pin 13 is inserted through the bifurcated end of the handle and other parts and firmly secures the whole together. Rivet-pins 14 are also used in properly fastening the scraper and clamping-plates together. The scraper is provided with corners 5 and 6, which will facilitate the work of cleaning by getting into the grooves, interstices, and the ornamental rough surfaces of dishes and like articles. The device can be used on the finest and most delicate china without injuring the same in the least.

By means of this device the greater part of the grease and other substances may be easily and quickly removed from dishes before the same are placed in the dish-water, thus keeping the latter cleaner and greatly facilitating the operation of washing. Another advantage is that the use of the device is noiseless.

Having thus described my invention, what I claim is—

In a device of the kind described, a scraper-pad, companion plates clamping said pad on either side and presenting a less area, said plates being provided with socket-recesses, and a handle provided with a bifurcated end, the prongs of which engage said socket-recesses in securing the handle in place.

In testimony whereof I affix my signature in presence of two subscribing witnesses.

JOHN T. FOSKETT.

Witnesses:
    L. B. COUPLAND,
    J. P. DONALSON.